United States Patent [19]

Zimmerman, Jr.

[11] Patent Number: 4,981,430

[45] Date of Patent: Jan. 1, 1991

[54] PNEUMATICALLY OPERATED MOLD EJECTION APPARATUS

[76] Inventor: Joseph E. Zimmerman, Jr., 21401 SW. 127 Ave., Miami, Fla. 33177

[21] Appl. No.: 299,890

[22] Filed: Jan. 23, 1989

[51] Int. Cl.$^5$ .............................................. B29C 45/42
[52] U.S. Cl. ........................................ 425/444; 249/67; 264/335; 425/556
[58] Field of Search .............. 425/556, 444, 437, 554, 425/351, 422, 438, DIG. 102; 264/335, 334; 249/66.1, 67, 68, 102

[56] References Cited

U.S. PATENT DOCUMENTS

| | | | |
|---|---|---|---|
| 3,327,355 | 6/1967 | Carlin | 249/66.1 X |
| 3,666,229 | 5/1972 | Carrel-Billiard | 249/66.1 |
| 3,871,611 | 3/1975 | Taketa | 249/102 |
| 3,892,512 | 7/1975 | Diehl | 425/438 X |
| 3,914,086 | 10/1975 | Hujik | 249/68 X |
| 3,952,991 | 4/1976 | Schneider | 264/335 X |
| 4,375,948 | 3/1983 | von Holdt | 425/437 |
| 4,497,624 | 2/1985 | Brun et al. | 425/556 X |
| 4,531,703 | 7/1985 | Underwood | 425/556 X |
| 4,620,958 | 11/1986 | Wiechard | 425/444 X |
| 4,653,997 | 3/1987 | Sheffield et al. | 425/351 X |
| 4,686,076 | 8/1987 | Dromigny et al. | 425/444 X |

Primary Examiner—Richard L. Chiesa
Attorney, Agent, or Firm—Robert J. Van Der Wall

[57] ABSTRACT

A pneumatically operated mold ejection apparatus using a pneumatic pressure source exterior to a multi-plate injection molding tool. The pressure source operates at least one knock-out pin disposed within a molding plate. Said pin is connected to a pneumatic piston spring loaded against a stop positioning the pin flush with the inner wall of the cavity during injection of plastic. The stop also positions the piston so that compressed air can reach the piston's surface when the pressure source is actuated. The piston includes a circumferential annular groove containing an O-ring for pneumatic sealing. The back side of the molding plate includes pneumatic channels between the cylinder and their intersection with a complimentary channel in the backing plate. These channels connect the system to the pressure source, and are surrounded by an O-ring trapped between the molding and backing plates for pneumatic sealing.

10 Claims, 4 Drawing Sheets

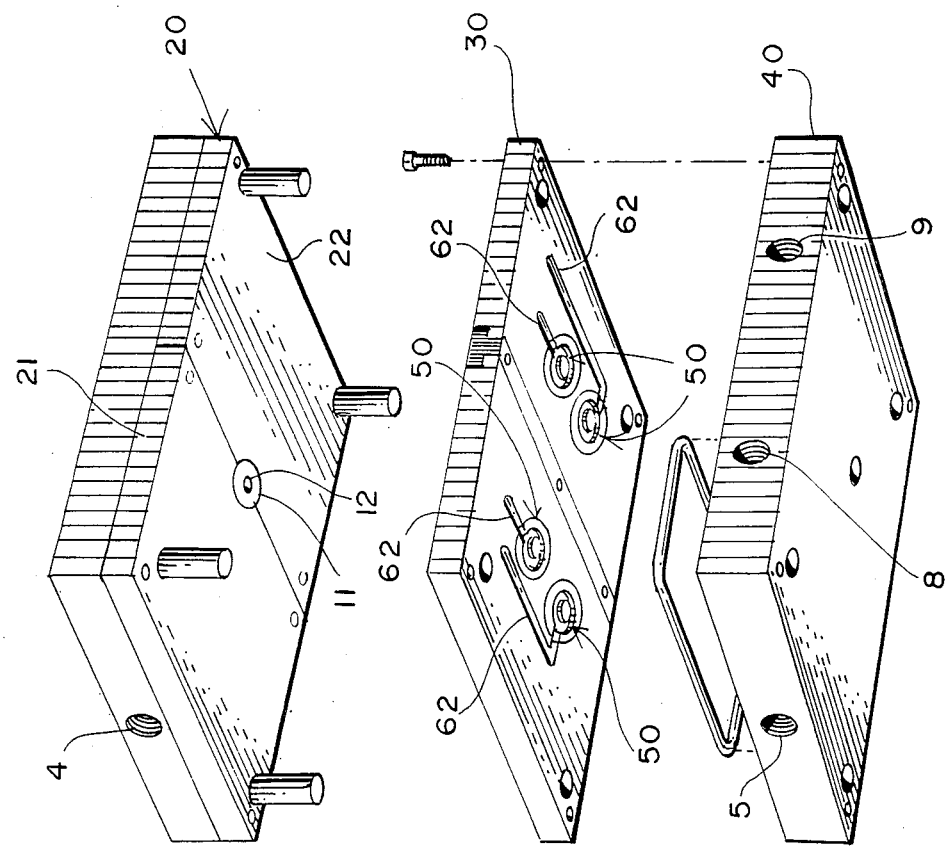
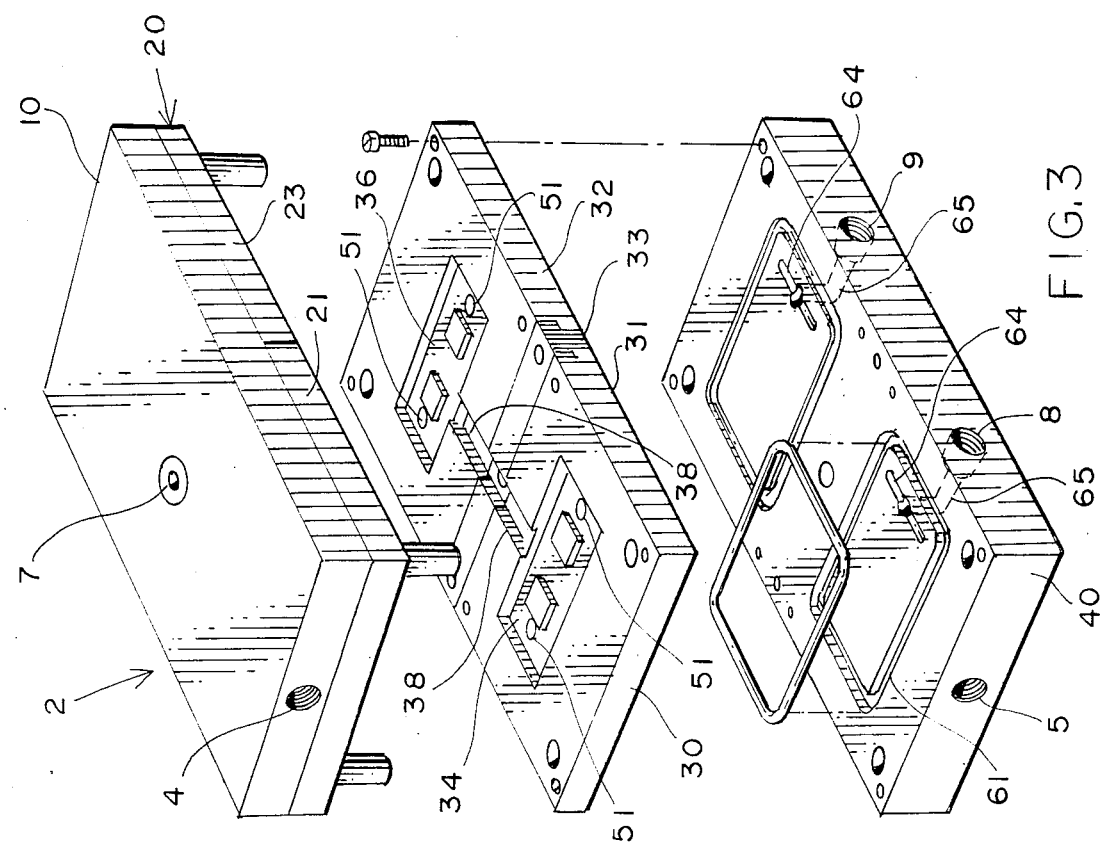

PNEUMATICALLY OPERATED MOLD EJECTION APPARATUS

FIELD OF THE INVENTION

The present invention relates primarily to the field of injection molding using multiplate molds with replaceable core and cavity plates that may be of a multicavity structure. It will be described in respect to injection molding, but the invention applies to related fields as well, including especially compression molding, structural foam molding and reaction injection molding. More particularly, the invention relates to an apparatus to facilitate ejection of the workpieces from the mold regardless of the positioning of the cavities as the core and cavity plates are changed. It further relates to the method of repositioning the ejection apparatus to accommodate the repositioned cavities without drilling a plurality of holes through the backing plates of the mold as is presently practiced in the art.

BACKGROUND OF THE INVENTION

Injection molding of many products is a practical, efficient and economical fabrication technique for many plastic articles and parts. Injection molding apparatus generally includes a mold formed of two portions, one of which is a cavity and the other a core which together correspond to the part being molded. The plastic or other material of which the article or part is fabricated is melted and mixed and then injected into the mold, following which the two portions of the mold are opened to eject the finished part referred to hereinafter as the workpiece. The equipment is designed to open and close the mold portions and of course they are held tightly together in appropriate alignment during the molding process. Usually one portion of the mold is held in fixed position while the other portion is movable to permit ejection of the workpiece.

The economies of injection molding are only achieved, however, if the volume of articles or parts is such to justify the set-up costs, including design and creation of the tooling. A change in any feature of a molded part must either be machined into what the mold is already producing, i.e, machined on the article itself rather than the mold, destroying much of the economies of injection molding, or the tool (mold) must be revised or replaced at substantial cost.

It is for that reason that replaceable cavity and core portions of molds have been developed. An excellent example of this is the apparatus of Taketa, U.S. Pat. No. 3,871,611 which contains a lucid disclosure on this technique. Further, the use of replaceable cavity and core portions of a mold is facilitated by the use of multiplate molds, which are also known in the art. Examples of multiplate molds are taught by Diehl, U.S. Pat. No. 3,892,512 and by Carlin, U.S. Pat. No. 3,327,355.

These and similar devices known in the art allow the costs of certain tooling changes to be reduced by replacement only of the core and cavity portions of the mold. Indeed, for some short run items, the core and cavity portions can be made of softer material that is easier and less expensive to machine, such as aluminum. This is because the core and cavity plates are reinforced by backing plates that may be made from more durable and rigid material such as steel.

Injection molding includes a requirement for effective removal of the workpiece from the mold cavity when the mold is opened so the mold can be recycled to produce a new workpiece. The apparatus and methods conventionally used in the injection molding art to eject the workpiece from the mold include knock-out pins and gas pressure applied directly to the workpiece. Knock-out pins have frequently involved mechanically moved or hydraulically pressurized operators. Of course, the knock-out pins must be properly positioned in regard to the cavity to achieve their purpose of removing the workpiece without damaging same. When multiplate molds or tools are used, with various different cavity locations, repeated relocation of the knock-out pins has historically necessitated drilling through the backing plates so often that they can begin to look like a swiss cheese and must be replaced. Furthermore, mechanically operated knock-out pins which are actuated using an ejector plate movable within an ejector box, must be located to avoid cooling water lines in the backing plate. Gas pressure or blow-out ejection devices suffer from the disadvantage that the orifice necessarily formed within the inner wall of the mold cavity frequently becomes plugged with a plastic or other material from which the workpiece is made. This difficulty with blow-out devices is well documented in the prior art herein described.

The present invention provides an apparatus that overcomes both of these foregoing disadvantages of the prior art by using a pneumatically actuated knock-out pin whose structure is entirely disposed within one or both molding plates. These are the portions of a multiplate mold that are retooled anyway for any design changes. Pneumatic channels within, but on the surface of, the molding plate bring the pressure source to wherever the knock-out pin should be disposed for best effectiveness.

Because a pneumatically pressurized knock-out pin utilizes a piston operator, a pre-examination search commissioned by the inventor of the present invention revealed a variety of prior art references dealing with knock-out devices, pneumatics, piston operators and the like. Most of this prior art is of modest relevance to the disclosure, but is recited for whatever background is obtainable therefrom.

For example, Schneider, U.S. Pat. No. 3,952,991 teaches a type of knock-out device that uses a piston as a valve rather than as the operator itself. It is really a type of blow-out device, and this reference also parenthetically discloses a use of a piston as a valve for flow of plastic or the like during the portion of the molding cycle when injection is not occurring. Another type of blow-out device is taught by Sheffield, et al., U.S. Pat. No. 4,653,997, which utilizes miltiple ports and a retractable port to assist removal of a lightweight workpiece such as a plastic cup. No pneumatically pressurized piston applies knock-out force to the workpiece in this reference.

Other pneumatically operated knock-out devices are those taught by Hujik, U.S. Pat. No. 3,914,086 which discloses a pneumatic piston operator with a custom shaped head for a particularized product. See also Dromigny, et al., U.S. Pat. No. 4,686,076 which uses a piston actuator in conjunction with an injection mold to hold a preprinted film in place in the mold to combine the film with the material from which the workpiece is fabricated.

Bearing in mind the foregoing, it is a principal object of the invention to provide an ejection apparatus for use with a multiplate mold, the structure of which is disposed entirely within a replaceable molding plate, usually the cavity plate.

A related object of the invention is to permit the ejection apparatus to be relocated as design changes are made without making changes to the backing plates or any other exterior surface of the mold.

A further object of the invention is to utilize a pneumatic operator for the ejection apparatus as an economical source of force that can be readily introduced into the mold and easily controlled from the mold exterior.

Another object of the invention is to utilize knock-out pins which can be machined to close tolerances with a bore in which they move axially to prevent leakage of the plastic or other molding material into the ejection apparatus.

An additional object of the invention is to utilize a compact apparatus for ejection so that as many knock-out pins can be positioned at optimal locations within a molding plate as are needed to optimize efficient ejection of the workpiece from the molding surface or cavity without damaging same.

An allied object of the invention is to use ejection apparatus of standardized configuration so that the apparatus will be interchangeable with a plurality of locations in each of a plurality of molding sites in a multi-cavity tool and also between a plurality of different molding plates.

A further object of the invention is to utilize an apparatus for ejection from an ejection molding multiplate tool that is appropriate for use with a molding plate that may be made from an easily machined material such as aluminum to economize on tooling changes for short run articles or parts.

Also an object of the invention is to provide a method for ejection of workpieces from a multiplate injection molding tool which can be repositioned economically as tooling changes are made within the molding plates.

A further object of the invention is to provide a method for ejection of a workpiece from a multiplate mold wherein repositioning can be achieved entirely within the molding plate.

A related object of the invention is to provide a method that facilitates repositioning of knock-out apparatus.

An additional object of the invention is to utilize a pressure (power) source external of the mold whose control and adjustment are easily and economically achieved.

A collateral object of the invention is to utilize a pressure source which, when introduced within the exterior surface of the mold will be harmless if the same leaks from the path to which it is directed.

An allied object of the invention is to utilize a pressure source which, when introduced into the mold can be directed without expensive fittings, piping, such as is necessary if the force were derived using hydraulic fluid to move an ejector plate as is known in the art.

Other objects and advantages of the present invention will be apparent to those skilled in the art upon reference to the following descriptions and the appended drawings.

SUMMARY OF THE INVENTION

In accordance with a principal aspect of the invention there is provided pneumatically operated mold ejection apparatus using a pneumatic pressure source of conventional means exterior to a multiplate tool, which pressure source is selectively activated using the mold cycle to operate at least one knock-out pin disposed within the molding plate usually the cavity plate. The knock-out pin is connected to a piston that is urged by biasing means to a stop such that the knock-out pin is positioned flush with the inner wall of the molding surface or cavity during the injection of plastic or other molding material into the tool. The stop also positions the piston so that gas, normally compressed air, can enter into the cylinder to bear upon the piston surface when the external pneumatic pressure source is selectively actuated. The piston preferably has about its circumference an annular groove in which is disposed a cylinder O-ring to optimize pneumatic sealing between the circumference of the piston and the inside diameter of a bushing that preferably forms the cylinder walls.

The side of the molding plate opposite the molding surface is characterized by at least one pneumatic channel between the cylinder and an intersection with a complimentary pneumatic channel in the backing plate. The latter is perforated by a pneumatic orifice which in turn is connected to the external pneumatic pressure source and valving and regulating means for control and selective actuation of the system. THe pneumatic channel of the molding plate is surrounded by a perimeter groove in which is disposed a perimeter O-ring to optimize sealing against leakage of the compressed air from between the molding plate and the adjacent backing plate. Thus, fluid communication is established from the external pneumatic pressure source through the valve, which selectively actuates it, to the pneumatic orifice into the tool, and thence through the complimentary pneumatic channel and molding plate pneumatic channel to the piston. Therefore, when the external pneumatic pressure source is actuated at the proper time in the mold cycle, fluid communication to the piston results in a force opposite that of the biasing means to move the knock-out pin from its position flush with the interior surface of the molding surface or cavity and against the workpiece to eject the same from the molding surface or cavity when the mold is opened. Incidentally, the biasing means is preferably a coil spring mounted on the shaft of the knock-out pin, but any biasing means may be used, including reversing pressure in the pneumatic system.

The apparatus is designed so that the pneumatic orifice and complimentary pneumatic channel, which are disposed in a backing plate, provide a pressure source for as many or as few of the knock-out pins as are needed in a molding plate and at any location. The perimeter groove and perimeter O-ring are also disposed in the backing plate and simply surround the area in the adjacent molding cavity plate where any knock-out pins could possible be desired. As will be seen from the following detailed descriptions and upon reference to the drawings, optimum use of this concept may result in the selection of more than one pneumatic orifice, complimentary pneumatic channel and perimeter groove and O-ring although that decision, once made, cannot be changed so readily as the changes in the cavity and core (molding) plates as described above. The most likely reason for a plurality of pneumatic orifices, complimentary pneumatic channels and perimeter grooves and O-rings is that the cavity plate and core plate can be divided into a plurality of same to increase the flexibility and the molding of a number of short run articles or parts.

In accordance with another major aspect of the invention, there is provided a method for the relocation of injection molding workpiece ejection means within a multiplate mold having replaceable core and cavity plates. The method contemplates the use of relocatable pneumatic cylinders containing actuating pistons and a series of pneumatic channels all of which are disposed within the molding plates. The method also contemplates a pneumatic pressure source, valving and control means of conventional design for selective actuation of the apparatus and the placement of at least one pneumatic orifice and the accompanying complimentary pneumatic channel surrounded by a perimeter groove and O-ring in a backing plate.

With this as a starting point, the inventive method contemplates the placement of at least one knock-out pin in a molding plate which is usually a cavity plate. The knock-out pin connects to a piston which is disposed within cylinder walls formed by a bushing placed in a hole step drilled in the side of the molding plate opposite the molding surface. Prior to assembly of the cavity plate to the cavity backing plate, the knock-out pin, piston with annular grooves and cylinder O-rings and biasing means in the form of a coil spring are placed within a bushing and held with a snap ring retainer to form a completed pneumatic cylinder and knock-out pin mechanism. The snap ring retainer fits in a groove machined in the inside of the bushing.

Also prior to assembly of the molding plate and backing plate, pneumatic channels are machined into the back of the molding plate to provide fluid communication between the pneumatic orifice and the pneumatic cylinder through the pneumatic channel and complimentary pneumatic channel when assembly is completed. Of course, as many of these pneumatic cylinder knock-out pin mechanisms can be utilized as desired since they are simply placed into the back of the molding plate and the pneumatic channels are machined to interconnect them with the pneumatic pressure source. This procedure can be relatively inexpensive, because the molding plate for short run articles or parts can be fabricated from an easy-to-machine material such as aluminum.

In accordance with a consequent aspect of the invention, the method is provided for utilization in actual molding practice of the above-described apparatus and method of assembly to actually eject workpieces from cavities in a multiplate injection molding tool when the same is opened. A convention pneumatic pressure source is connected upstream of a pressure regulator and valve, which valve is actuated by reference to the cycle of the injection molding machine at a time when ejection of the workpiece from the mold cavity is desired. When actuated, the valve opens and pneumatic pressure passes through at least one pneumatic orifice and into a complimentary pneumatic channel, both of which have previously been machined into the backing plate. Then the pneumatic pressure passes from an intersection between the complimentary pneumatic channel to the pneumatic channel or a plurality of same disposed in the back of the molding plate.

Excessive leakage of pneumatic pressure is prevented by the combination when assembled of the cavity backing plate, cavity plate, and perimeter O-ring disposed in a perimeter groove surrounding the intersection of all pneumatic channels and complimentary pneumatic channel. The pneumatic pressure then passes from the pneumatic channel to the operating surface of the pneumatic piston disposed within cylinder walls formed by the bushing. Sealing between the piston working surface and the inside diameter bushing or cylinder wall is achieved using the cylinder O-ring disposed with an annular groove around the piston working surface. Once the pneumatic pressure has reached the working surface of the pneumatic cylinder, a force is exerted thereon depressing the biasing means in the form of a coil spring and moving the knock-out pin out from the molding surface or the mold cavity to eject the workpiece therefrom.

The invention will be better understood upon reference to the following detailed description and the drawings in which:

BRIEF DESCRIPTION OF DRAWINGS

FIG. 3 is a top perspective exploded view of a multiplate tool showing some of the internal features of the present invention.

FIG. 4 is a bottom perspective view of the same multiplate mold and illustrating other of the features of the present invention.

DETAILED DESCRIPTION OF THE PREFERRED EMBODIMENTS

Figure 1:
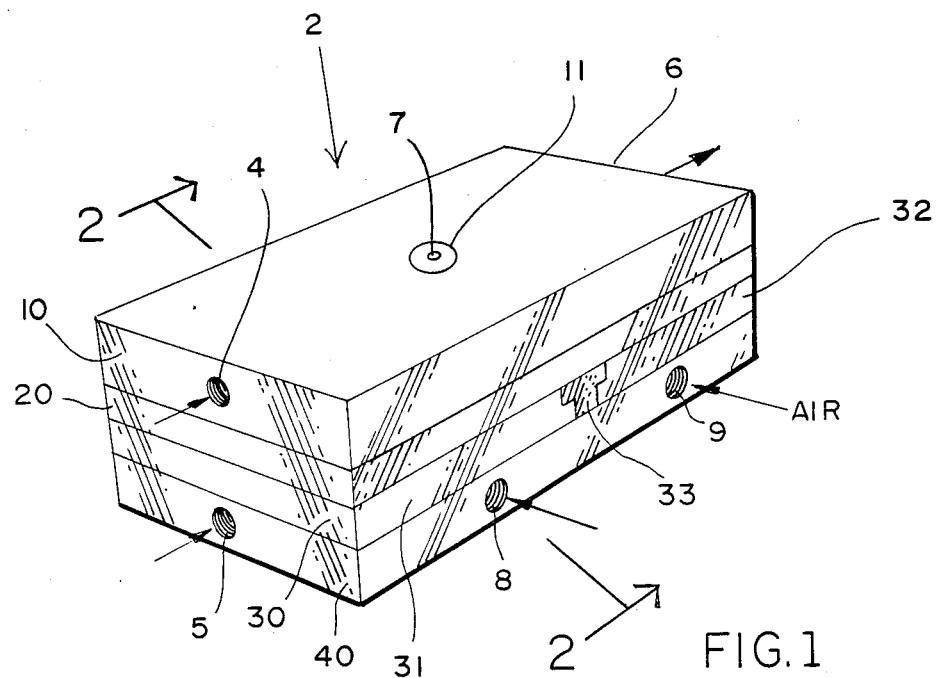
FIG. 1 is a perspective view of an assembled multiplate mold or tool of the type employed in the present invention.

FIG. 1 shows a perspective view of the principal portions of an assembled multiplate mold or tool 2 which is adapted for use in the manner of the invention. It shows a cooling inlet 4 for the core backing plate 10 and cooling inlet 5 for the cavity backing plate 40 which is sometimes referred to in the trade as the clamp side. The core backing plate 10 is also referred to in the trade as the hot side and the cooling outlet 6 is on the far side thereof. The sprue port 7 is shown on the upper surface thereof. The sprue port is the point at which plastic or other molding material is injected into the mold using the injection molding machine. The injection molding machine is of a conventional type and is not shown. The sprue port 7 is shown surrounded by the exterior of the sprue bushing 11. Shown sandwiched between the core backing plate 10 and the cavity backing plate 40 are the core plate 20 and cavity plate 30. On the cavity backing plate 40 are shown pneumatic inlets 8 and 9. The cavity plate 30 is shown in optional split form 31 and 32 separated by T-bar 33 which is also used to hold 31 and 32 to cavity backing plate 40.

Figure 2:
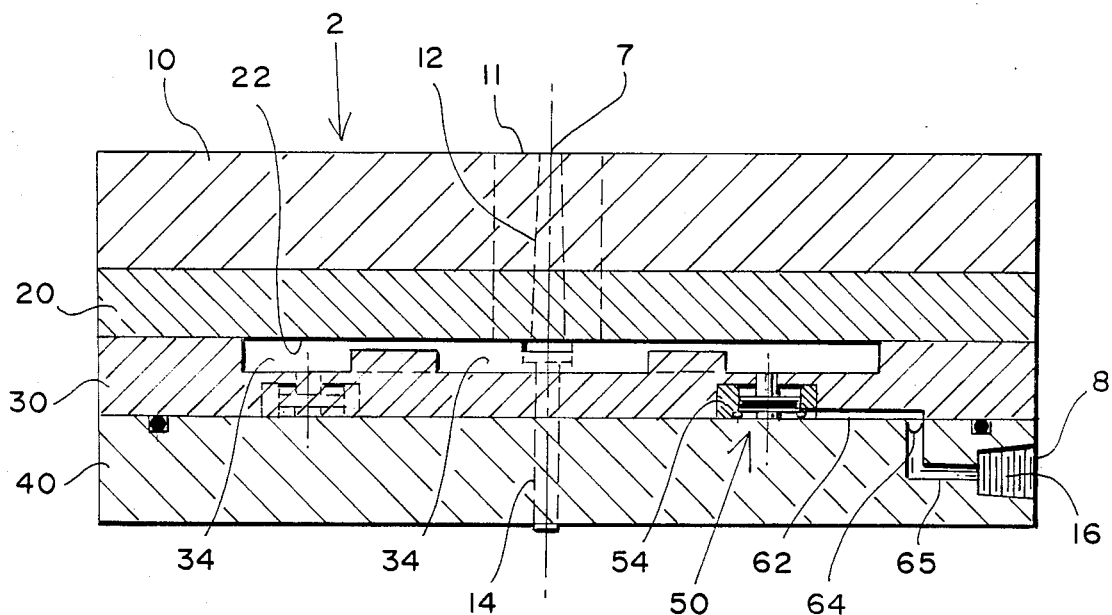
FIG. 2 is a cross-section view taken through the multiplate tool of FIG. 1 through the line 2—2 thereof.

Turning now to FIG. 2, a cross-sectional view taken through the line 2—2 of FIG. 1 shows the multiplate tool 2 in assembled form with core backing plate 10 on top of core plate 20 which is, in turn, on top of cavity plate 30. At the bottom of the stack is cavity backing plate 40. At this point it should be noted that core plate 20 is not shown with a core profile, having a substantially planar surface in proximity to the first cavity 34. The reason is that the particular product first made using the invention is a flat profile part using a textured surface. Thus the mold aspects of core plate 20, textured surface 22, in the illustrated example, simply provides texturing to the part, but the invention disclosed is no less applicable to the normal situation where both a core and cavity are utilized, and placing of knock-out pins in the core plate with analogous changes to the core backing plate as to those in the cavity backing plate are obviously contemplated although not specifically described for the application shown. It is for this reason that the generalized terms molding plate and molding surface are mostly used in the application in lieu of the more specific cavity plate and cavity.

FIG. 2 also illustrates sprue port 7, of sprue 12 which is disposed within sprue bushing 11. Also disclosed in sprue knock-out 14.

Also disposed within cavity plate 30 is pneumatic cylinder and knock-out pin mechanism 50, which will be more fully described in connection with other figures. A pneumatic pressure source external to the mold, and of conventional design, selectively applies pressure to the interior of the mold through pneumatic inlet 8 which may be threaded at 16 to achieve a substantially pressure tight connection between pneumatic orifice 65 and the external pneumatic pressure source, now shown. There is then fluid communication between the external pneumatic pressure source through pneumatic inlet 8 and pneumatic orifice 65 and intersecting complimentary pneumatic channel 64 and thence through pneumatic channel 62 to pneumatic cylinder and knock-out pin mechanism 50.

FIG. 3 shows three of the four plates in multiplate mold 2 in an exploded configuration to illustrate the internal features of the present invention. In this view, core backing plate 10 and core plate 20, which in this example is a texture plate, remain assembled to each other notwithstanding the exploded configuration in the remainder of the figure. It will be seen in this figure also that core plate 20 has been divided into two portions 21 and 23 corresponding to the two portions 31 and 32 of the cavity plate, which are held in place and separated by T-bar 33. It will be seen that cavity plate 30, really divided into cavity plates 31 and 32 is a multicavity plate having a first cavity 34 and a second cavity 36. When the mold is in operation, plastic or other molding material is injected from the injection molding machine through the sprue port 7 until it reaches the cavity plate 30 at which point the flow is divided along runner 38 to the two cavities 34 and 36. In each of these cavities, knock-out pins 51 can be seen.

Cavity backing plate 40, referred to in the trade sometimes as the clamp side, has pneumatic inlets 8 and 9 which are in fluid communication with pneumatic orifice 65 and complimentary pneumatic channel 64. There is also machined in the upper surface of cavity backing plate 40 a perimeter groove 61 in which is disposed a perimeter O-ring 60. The perimeter O-ring 60 is pressed between cavity plate 30 and cavity backing plate 40 when they are assembled to minimize leakage of compressed air used to control knockout pins 51.

In FIG. 4 the underside of the core plate 20 and cavity plate 30 can be seen. As noted previously, the core plate in this instance does not have a profile, but is of a planar configuration although there is no intention to limit the present invention thereby. Core plate 20 includes a textured surface 22 which is what is desired for the particular parts in question. Sprue bushing 11 and sprue 12 are also visible, and core plate 20 is shown split, 21 and 23 correspond to cavity plates 31 and 32 separated by T-bar 33. On the underside of cavity plate 30 can be seen pneumatic channels 62 which intersect with complimentary pneumatic channel 64 as shown in FIG. 3. Note that pneumatic channels 62 are all disposed within the area surrounded by perimeter O-ring 60. Also, seen are pneumatic cylinder and knock-out pin mechanism 50 which will be more fully described hereinafter in regard to FIG. 5, etc.

Figure 5:
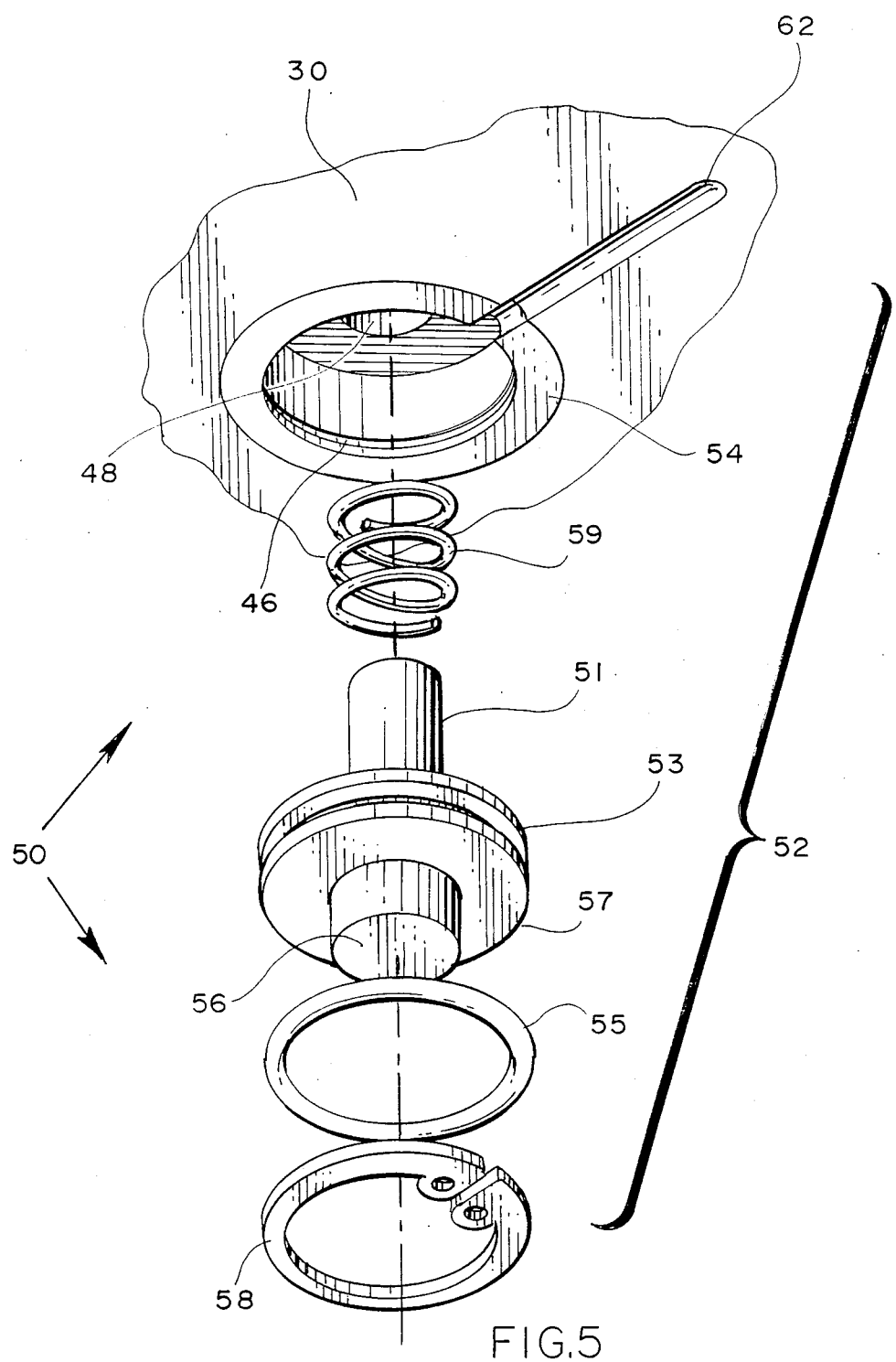
FIG. 5 is an enlarged bottom perspective exploded view of the pneumatic cylinder seen in assembled form as part of the center portion of FIG. 4.

FIG. 5 is an enlarged exploded view of pneumatic cylinder and knock-out pin mechanism 50 that includes knock-out pin 51, coil spring 59, piston surface 57, snap ring retainer 58, etc. Disposed about the piston surface 57 is an annular groove 53 in which is placed a cylinder O-ring 55. Offset or raised from piston surface 57 is a base flat 56 whose purpose will be described in regard to subsequent figures. When assembled, these parts form a pneumatic cylinder 52 when disposed within bushing 54. They are held in position during assembly of the mold plates by placement of snap ring retainer 58 in snap ring groove 46, which has been machined in bushing 54. Also seen machined in the underside of cavity plate 30 is pneumatic channel 62 which supplies air pressure to piston surface 57 through the complimentary pneumatic channel 64 as seen in FIG. 3. Knock-out pin 51 closely fits within the bore 48, the edge of which is seen in FIG. 5.

Figure 6:
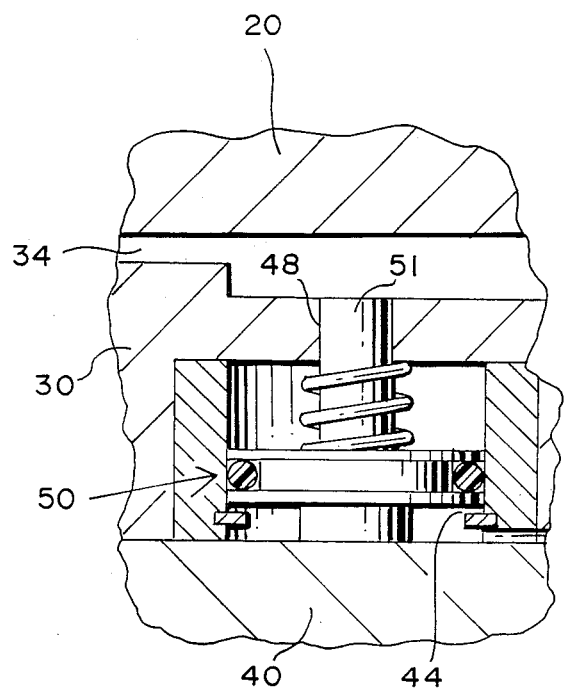
FIG. 6 is an enlarged fragmentary cross-section view of the pneumatic cylinder and knock-out pin mechanism shown in exploded view in FIG. 5 and is the first of four such views illustrating the operation of this mechanism. In this figure, the mold and mechanism are shown in assembled form prior to injection of the plastic or other molding material into the mold, with a knock-out pin flush with the interior surface of the mold cavity.

FIG. 6 is an enlarged fragmentary cross-section view showing the pneumatic cylinder and knock-out pin mechanism 50 in assembled form and with the took closed prior to injection of the injection of the plastic or other molding material. That is cavity 34 is empty but core plate 20 is in close proximity to cavity plate 30. Knock-out pin 51 is in close fitting relationship to bore 48 the edge of which can be seen in this figure. The effect is to minimize leakage of the plastic or other molding material from the cavity into the pneumatic cylinder and knock-out pin mechanism 50.

Figure 7:
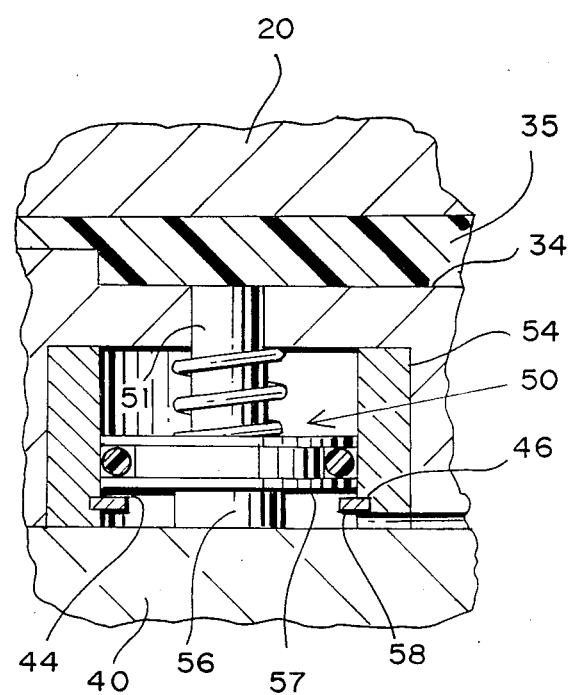
FIG. 7 is also an enlarged fragmentary cross-section view of the pneumatic cylinder and knock-out pin mechanism with the cavity having been filled by the injection of plastic or other molding material.

FIG. 7 is also an enlarged fragmentary cross-section view of the knock-out pin mechanism 50 with the cavity 34 having been filled by the injection of plastic or other molding material 35. It will be seen that knock-out pin 51 remains flush with the floor of cavity 34 the upper surface of which forms a part of the cavity. In fact, pneumatic cylinder and knock-out pin mechanism 50 remains positioned as it was in FIG. 6. The precise location of knock-out pin 51 flush with the inside surface or floor of cavity 34 is accomplished by the fact that base flat 56 rests firmly on cavity backing plate 40. It is expressly not dependent on the position of snap ring retainer 58 which is disposed within the snap ring groove 46 which has been machined into the inside surface of bushing 54. This fact can be seen from reference to the air gap existing at 44 between the upper surface of snap ring retainer 58 and piston surface 57. This is because snap ring retainers do not provide nearly as precise a location for the top of knock-out pin 51 as can be accomplished using base flat 56 resting upon cavity backing plate 40.

Figure 8:
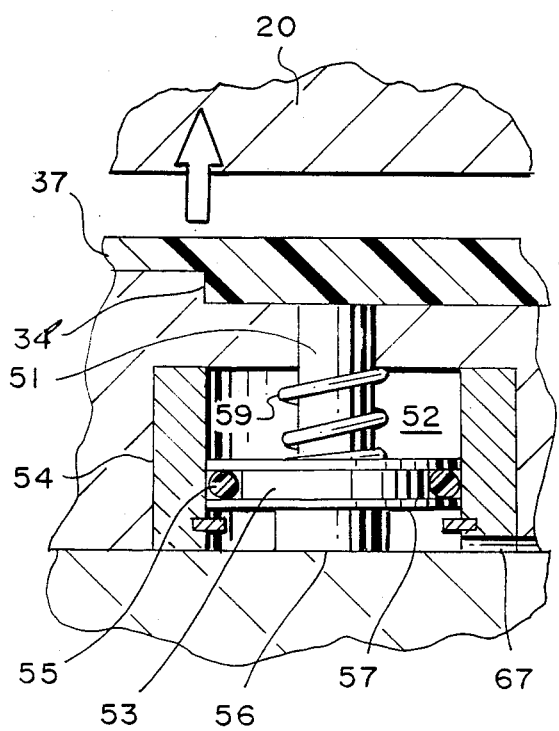
FIG. 8 is another enlarged fragmentary cross-section view showing the core plate or clamp opened preliminary to ejection of the workpiece from the cavity in the mold.
Figure 9:
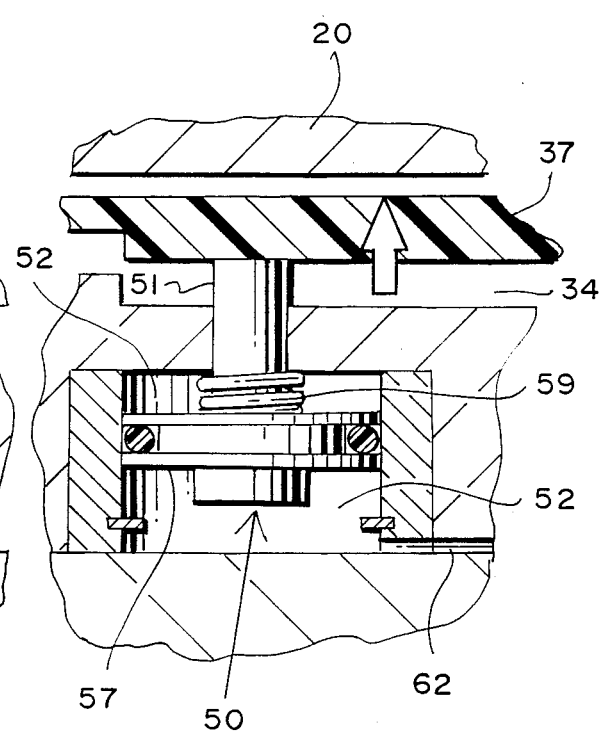
FIG. 9 is the final enlarged fragmentary cross-section view illustrating use of the pneumatic cylinder and knock-out pin mechanism ejecting the workpiece from the cavity in the mold and showing the coil spring biasing means compressed as a consequence of the pneumatic pressure applied to the working surface of the piston.

FIG. 8 is a further enlarged fragmentary cross-section view of the pneumatic cylinder and knockout pin mechanism 50. The positioning thereof remains as shown in FIGS. 6 and 7, the main purpose of FIG. 8 being to illustrate that core plate 20 has been retracted as the mold is opened so that the plastic molded workpiece 37 can be removed using the procedure shown in FIG. 9. Before proceeding to FIG. 9, however, it is useful to note that base flat 56 is held firmly on cavity backing plate 40 using biasing means preferably in the form of coil spring 59. This biasing means also serves to return knock-out pin 51 to its position flush with the floor of cavity 34 after the same has been utilized as shown in FIG. 9, but alternative biasing means can be employed to achieve the same result. Pneumatic sealing is maximized by cylinder O-ring 55 disposed within annular groove 53. The external circumference of cylinder O-ring 55 bears on the interior cylinder wall formed by bushing 54. Piston surface 57 is separated from cavity backing plate 40 using base flat 56 to allow compressed air to enter into pneumatic cylinder 52 from pneumatic channel 62, which in turn is in fluid communication with the external pressure source above-described.

Turning finally to FIG. 9, the objective of ejection of workpiece 37 is accomplished using pneumatic cylinder and knockout pin mechanism 50. Compressed air has entered pneumatic cylinder 52 through pneumatic channel 62 and is thus applying a sufficient force on piston surface 57 to compress coil spring 59, raise knock-out pin 51 and move workpiece 37 from within cavity 34. Core plate 20 remains retracted so that workpiece 37 can be removed from the tool.

In addition to the apparatus described and the method by which the same is operated, the invention contemplates a method by which cavities can be changed and moved, and more particularly, knock-out pins can be readily relocated to accommodate tooling changes for short run articles and parts. The method generally comprises the following steps:

1. Determining the size and shape of the cavity and core to injection mold the product and placement of the same within the body of a multiplate tool.

2. Machining of the core and cavity portions of the core and cavity plates in a multiplate tool that will form the article or part.

3. Establishing appropriate locations for knock-out pins.

4. Calculating the appropriate height of a knock-out pin such that the distance between a base flat surface and the top of the knock-out pin will coincide exactly with the distance between the upper surface of a cavity backing plate and the molding surface of the molding plate at the location of each given knock-out pin.

5. Machining the knock-out pin to the length so established.

6. Boring the bottom of the molding plate to the correct diameter for the insertion of the knock-out pin in the location desired.

7. Step drilling in concentric manner the rear of the molding plate for the placement of a bushing forming the circumference of a pneumatic cylinder.

8. Machining a pneumatic channel into the rear of the molding plate to accomplish fluid communication between the site of the pneumatic cylinder and an intersection between a complimentary pneumatic channel previously placed in the interior surface of the backing plate.

9. Press fitting bushings into the locations drilled into the rear of the molding plate to form the circumference of the pneumatic cylinder.

10. Placing a coil spring on the shaft of a knock-out pin.

11. Placing a cylinder O-ring in an annular groove around a piston surface attached to the knock-out pin.

12. Inserting a knock-out pin into the bore previously disposed in the cavity plate to a sufficient depth for the following step.

13. Inserting a snap ring retainer into a snap ring groove previously machined in the inside diameter of the bushing.

14. Repeating the foregoing procedure for as many locations as determined above in step 3 for each of the knock-out pins desired.

15. Assembling the tool with a perimeter O-ring between molding plate and adjacent backing plate placed in a perimeter groove previously machined in the backing plate and surrounding the pneumatic channel and complimentary pneumatic channel.

While the invention has been described in connection with a preferred embodiment in regard to injection molding, it will be understood that there is no intention to thereby limit the invention. On the contrary, there is intended to be covered all alternatives, modifications and equivalents as may be included within the spirit and scope of the invention as defined by appended claims, which are the sole definition as the invention. Application thereof to the fields of compression molding, structural foam molding and reaction injection molding is specifically within the contemplation of the inventor.

What is claimed is:

1. In an improved multiplate multicavity molding tool having molding plates comprising a cavity plate and a core plate, backing plates comprising a cavity backing plate and a core backing plate, all taken in combination with an external pneumatic pressure source and accompanying pressure level and valving controls keyed to selectively actuate when the tool is opened to eject workpieces using knock-out pins, the improvement comprising:

for each said knock-out pin, a pneumatic piston disposed within and movable along an axis of a cylindrical opening machined into a said molding plate on a side opposite a molding surface thereof and forming a pneumatic cylinder thereby, said piston being connected to each said knock-out pin;

a stop in proximity to each pneumatic piston to accurately position each knock-out pin such that a portion thereof that contacts the workpiece adjacent said knock-out pin conforms with minimal surface discontinuity to the molding surface;

a biasing means disposed in physical communication with each pneumatic piston to both hold said piston firmly against the stop and to return said piston to the stop when the knock-out pin has been moved to eject the adjacent workpiece from the molding surface;

a pneumatic orifice spaced from each said cylindrical opening, penetrating at least one of the backing plates and in fluid communication with the external pneumatic pressure source;

a complimentary pneumatic channel spaced from each said cylindrical opening in fluid communication with the pneumatic orifice and disposed with the backing plate that the pneumatic orifice penetrates; and a pneumatic channel disposed within said molding plate extending from said complimentary pneumatic channel to each said cylindrical opening to establish fluid communication through the pneumatic orifice and complimentary pneumatic channel between the external pneumatic pressure source and each pneumatic piston in said molding plate.

2. The tool of claim 1 in which the molding plate is said cavity plate and the molding surface is a cavity.

3. The tool of claim 1 in which the molding plate is said core plate and the molding surface is a core.

4. The tool of claim 1 in which the molding plate is said core plate and the molding surface is a substantially planar textured surface.

5. The tool of claim 1 in which the pneumatic cylinder is further comprised of a bushing press fitted into the cylindrical opening machined into the molding plate, said bushing having an interior surface that forms a pneumatic cylinder wall in proximity to the pneumatic piston.

6. The tool of claim 1 in which the pneumatic piston is further comprised of an annular groove disposed about a circumference of a piston surface against which compressed gas bears, and a cylinder O-ring is disposed within the annular groove, said cylinder O-ring maximizing a pneumatic seal between the pneumatic piston and the cylindrical opening in which the pneumatic piston is disposed.

7. The tool of claim 1 in which the stop is comprised of a base flat raised from a piston surface against which compressed gas bears, said base flat coming in firm contact with said backing plate to which the molding plate is attached, thereby accurately positioning the knock-out pin to which the pneumatic piston is connected.

8. The tool of claim 1 in which the biasing means is a coil spring disposed about a shaft of the knock-out pin.

9. The tool of claim 1 which further comprises a perimeter groove machined into a backing plate surface that contacts said molding plate, and a perimeter O-ring is disposed within the perimeter groove to maximize a pneumatic seal circumscribing the pneumatic orifice and the pneumatic channel between the backing plate and the molding plate.

10. The tool of claim 1 in which molding plates are divided into a plurality of same and adjoining molding plates are held against bending pressure exerted thereon by compressed gas in the pneumatic channel using a T-bar bolted to the backing plate and confining adjacent edges of the adjoining molding plates.

* * * * *